US008965940B2

(12) United States Patent
Tse et al.

(10) Patent No.: US 8,965,940 B2
(45) Date of Patent: Feb. 24, 2015

(54) IMITATION OF FILE EMBEDDING IN A DOCUMENT (75) Inventors: David Tse, Kirkland, WA (US); Brian Holley, Kirkland, WA (US); Varun Srinivasan, Seattle, WA (US); Nathaniel Granor, New York, NY (US); Jonathan F. Kern, Kirkland, WA (US); Richard Eric Andeen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 13/553,819

(22) Filed: Jul. 20, 2012

(65) Prior Publication Data
US 2014/0025628 A1  Jan. 23, 2014

(51) Int. Cl.
G06F 12/00 (2006.01)
G06F 17/30 (2006.01)

(52) U.S. Cl.
USPC .......................................... 707/829; 707/826

(58) Field of Classification Search
None
See application file for complete search history.

(56) References Cited

U.S. PATENT DOCUMENTS

| | | | |
|---|---|---|---|
| 5,669,005 A | 9/1997 | Curbow et al. | |
| 5,802,531 A | 9/1998 | Lamiraux et al. | |
| 5,809,317 A | 9/1998 | Kogan et al. | |
| 5,812,862 A | 9/1998 | Smith et al. | |
| 7,908,562 B2 | 3/2011 | McKee et al. | |
| 2002/0065848 A1* | 5/2002 | Walker et al. | 707/511 |
| 2002/0138501 A1* | 9/2002 | Dake | 707/200 |
| 2003/0097640 A1 | 5/2003 | Abrams et al. | |
| 2004/0041696 A1* | 3/2004 | Hull et al. | 340/10.42 |
| 2005/0149861 A1* | 7/2005 | Bishop et al. | 715/515 |
| 2005/0240624 A1* | 10/2005 | Ge et al. | 707/104.1 |
| 2006/0129936 A1* | 6/2006 | Hamlett et al. | 715/733 |
| 2006/0136477 A1* | 6/2006 | Bishop et al. | 707/102 |
| 2006/0285152 A1 | 12/2006 | Skillen | |
| 2007/0136320 A1* | 6/2007 | Sah et al. | 707/100 |
| 2008/0059912 A1* | 3/2008 | Scherpa et al. | 715/853 |

(Continued)

FOREIGN PATENT DOCUMENTS

WO WO 2005098664 A1 * 10/2005
WO WO 2006017420 A2 * 2/2006
WO WO 2006017558 A2 * 2/2006

OTHER PUBLICATIONS

Satoh, Ichiro, "A Document-centric Component Framework for Document Distributions", Retrieved at <<http://citeseerx.ist.psu.edu/viewdoc/download?doi=10.1.1.79.3028&rep=rep1&type=pdf>>, Proceedings: Proc. 8th International Symposium on Distributed Objects and Applications Lecture Notes in Computer Science (LNCS), Springer,vol. 4276, Dec. 19, 2006, pp. 20.

*Primary Examiner* — Augustine K Obisesan
(74) *Attorney, Agent, or Firm* — Tom Wong; Jim Ross; Micky Minhas (57) ABSTRACT

A container document can include a file node indicating a file and pointing to a location for the file that is separate from the container document on a server. An embedded relationship between the file and the container document can be imitated. The imitation can include responding to user input by performing the update on the file node, and by requesting that the server perform an update on the file that reflects the update performed on the file node. A request for an update to be performed on the file node can be received from a client at the server. In response to the request, the update can be performed on the file node at the server. A corresponding update, which reflects the update performed on the file node, can also be performed on the file at the server.

19 Claims, 5 Drawing Sheets

(56) References Cited

U.S. PATENT DOCUMENTS

| | | |
|---|---|---|
| 2008/0082907 A1* | 4/2008 | Sorotokin et al. ............ 715/210 |
| 2008/0154969 A1* | 6/2008 | DeBie .......................... 707/200 |
| 2008/0262993 A1* | 10/2008 | Uematsu et al. .................. 707/1 |
| 2009/0161147 A1* | 6/2009 | Klave .......................... 358/1.15 |
| 2011/0055182 A1* | 3/2011 | Buban et al. .................... 707/704 |
| 2011/0307534 A1* | 12/2011 | Peng et al. ..................... 707/827 |

* cited by examiner

IMITATION OF FILE EMBEDDING IN A DOCUMENT

BACKGROUND

Content management systems can host content such as digital documents (hereinafter documents). Examples of such documents include word processing documents, spreadsheets, slide presentations, digital notebooks, etc. Content management systems have one or more features that interact with content in the documents. For example, content management systems may provide browser-based document editing applications, search indexing, versioning, property promotion/demotion, workflow involving the documents, document permissions and sharing, etc.

Users have been able to embed files into some documents that are managed by the content management systems. Users have also been able to insert file links into managed documents, and such links could point to other files that are hosted on the content management system.

SUMMARY

Embedding a file in a document hosted by a content management system can make the embedded file opaque to the hosting content management system. This can prevent the content management system from interacting directly with the embedded file to provide features specifically for that file. Also, inserting a link into a document and separately uploading the linked file to the content management system can break a containment relationship between the two files. As just one example, if someone copies the document that includes the link, the linked file may not be automatically copied with the linking document.

The tools and techniques discussed herein relate to imitation of file embedding in a document, which may be done without actually embedding the file in the document. Such tools and techniques can allow a file to appear as if it has been embedded in a container document, imitating an embedded relationship between the file and the container document (i.e., imitating one or more behaviors of embedded files). However, the container document and the file can be stored and maintained separately, which can allow a content management system to interact with the contained file to provide one or more features for that file.

In one embodiment, the tools and techniques can include a client document manager maintaining a container document. The container document can include a file node indicating a file and pointing to a location for the file that is separate from the container document on a remote server (though the pointing may be to a location on the remote server and to another location or via another location, such as to a location in a local cache). User input requesting an update to be performed on the file node can be received. The user input can be directed at the container document. An embedded relationship between the file and the container document can be imitated. The imitation can include responding to the user input by performing the update on the file node, and by requesting that the server perform an update on the file that reflects the update performed on the file node.

In another embodiment of the tools and techniques, a content management system can maintain a container document on a server. The container document can include a file node indicating a file and pointing to a location for the file that is separate from the container document on the server. A request for an update to be performed on the file node can be received from a remote client. The request can be directed at the container document. In response to the request, the update can be performed on the file node. Additionally, a corresponding update can be performed on the file. The corresponding update can reflect the update performed on the file node.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for imitation of file embedding in a digital document. Improvements may result from the use of various techniques and tools separately or in combination.

Such techniques and tools may include maintaining a container document on a client and a server. The container document can include file nodes indicating corresponding files and pointing to locations for the files that are separate from the container document on a remote server. With the files being stored separately from the container document, the files can be visible to a content management system running on the server. Thus, the content management system can provide features that directly access the files, such as file permission and sharing features, browser-based applications for accessing and editing the files, etc. However, an access request directed at a file node can result in access to the corresponding file. Also, the files and the container document can be managed to imitate more specific functionality that would be present if the files were embedded in the container document, even if that functionality would not be present if a mere link to the file were provided in the container document. For example, user input requesting deletion of the file node in the container document can also result in deletion of the file. As another example, user input requesting synchronization of the container document on the client and server can result in the files corresponding to file nodes in the container document also being synchronized. As yet another example, copying a file node and pasting it elsewhere in the container document to yield two file nodes can result in the creation of an additional copy of the corresponding file, so that there will be two files, with one corresponding to each of the two nodes. As yet another example, copying the container document may result in also copying the files referenced by file nodes in the container document. Some of this functionality for the actual files may be done in an asynchronous manner (i.e., where control is returned without waiting for performance of the functionality to be completed). For example, this may be done to improve performance by allowing lazy operations to be performed on the files, or to allow requested actions to be undone (e.g., by keeping a file for some period of time after deletion of the corresponding file node has been requested, to allow the requested deletion to be efficiently undone).

Accordingly, the tools and techniques discussed herein may provide one or more benefits, such as providing content management system functionality for files while imitating an embedded relationship by providing functionality that would be present if the files were embedded in the container document. The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
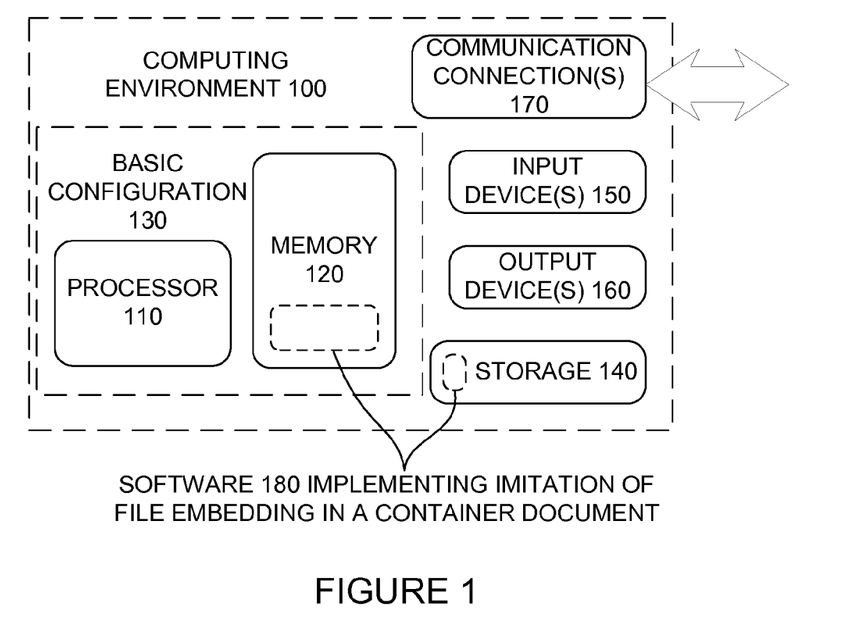
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a client or server. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing imitation of file embedding in a container document. An implementation of imitation of file embedding in a container document may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "request," "maintain," "perform," and "imitate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. System and Environment for Imitating File Embedding in a Document

A. System Overview

Figure 2:
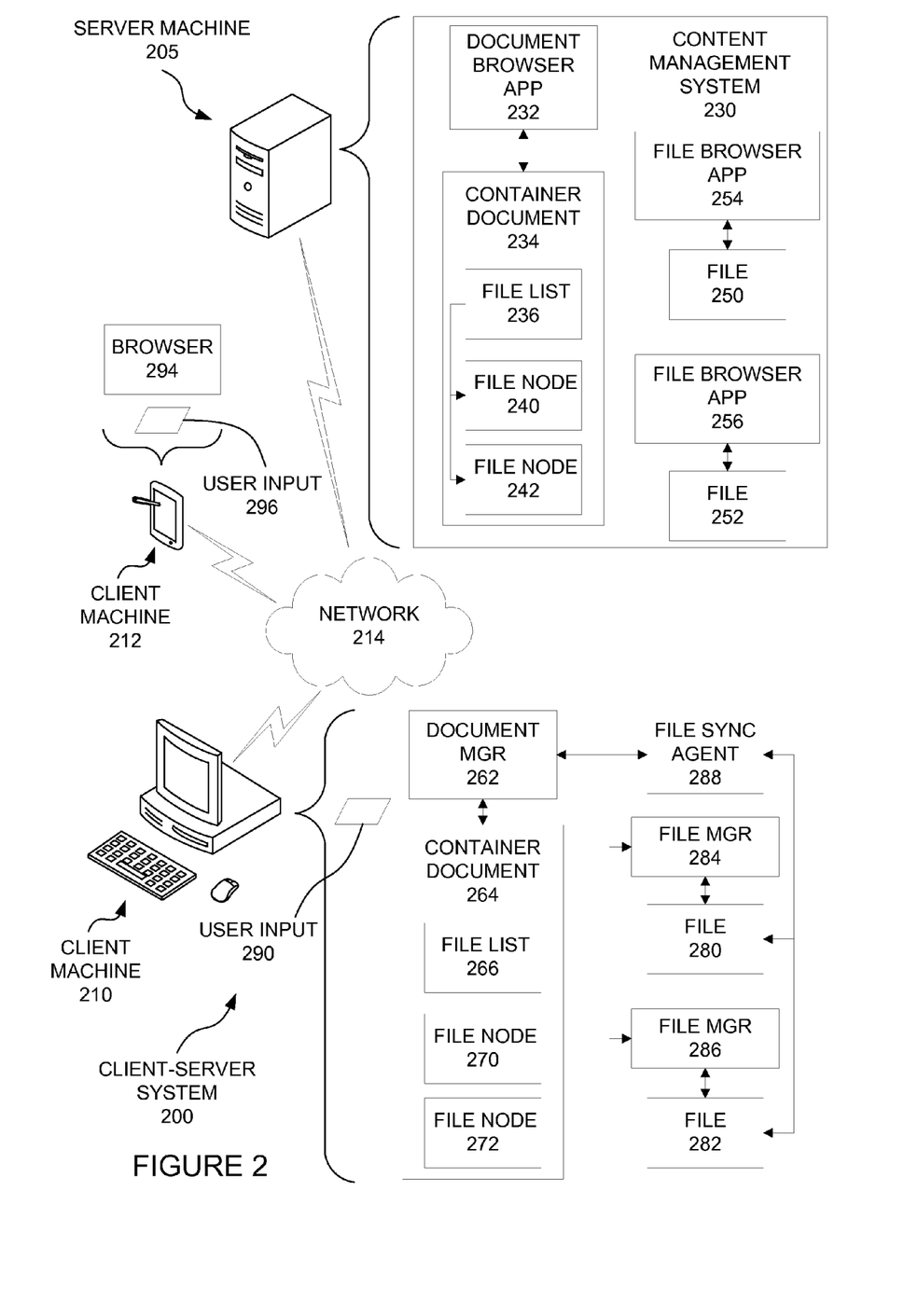
FIG. 2 is a schematic diagram of a client-server system in conjunction with which one or more of the described embodiments may be implemented.

FIG. 2 is a schematic diagram of a client-server system (200) in conjunction with which one or more of the described embodiments may be implemented. The system (200) can include a server machine (205), which may include one or more computing machines, such as multiple machines in a distributed server system. Client machines (210 and 212) can be connected to the server machine (205) through a network (214). For example, the server machine (205) may be remote from the client machines (210 and 212), and the network (214) may be a wired and/or wireless global computer network, wide area network, local area network, a combination of these, etc.

The server machine (205) can host a content management system (230), which can host digital content. The content management system (230) can include one or more applications. The functionality provided by one or more of the applications in the server machine may be provided by one or more software applications being executed by one or more processors, by hardware logic, by a combination thereof, etc. The content management system (230) can include a document browser application (232), which can provide client machines (210 and 212) with browser-based access (viewing, editing, etc.) to a container document (234). For example, the container document (234) may be a notebook document, a word processing document, etc.

The container document (234) may be formatted in one or more of various ways, such as a single file, multiple files (e.g., notes files for a notebook document) grouped together such as in one or more folders, etc. The container document (234) can include a file list (236), which can indicate files that are referenced by one or more file nodes (240 and 242) in the container document (234). The file list (236) may also include information about the file nodes (240 and 242), such as the locations of the file nodes in the container document (234). The container document (234) may also include metadata for the file nodes (240 and 242). This metadata may be included in the file list (236) and/or the file nodes (240 and 242). For example, the metadata may indicate the locations of the file nodes (240 and 242), information about files (250 and 252) referenced by the file nodes (240 and 242) (e.g., date created, last date modified, file type, file size, etc.), and/or other information related to the file nodes (240 and 242). The files (250 and 252) can be any of various different types of files, such as word processing files, spreadsheets, audio and/or video files, image files, etc.

The content management system (230) may include file browser applications (252 and 254) that can provide access and/or editing capabilities to clients using browsers (e.g., Web browsers). The content management system may also provide other features related to the container document (234) and the files (250 and 252). The file nodes (240 and 242) can each include a pointer or link to an associated file (250 or 252) on the server machine (205).

The client machine (210) may include a document manager (262), which can manage a client-side version of the container document (264). As with the version of the container document (234) on the server machine (205), the version of the container document (264) on the client machine (210) can include a file list (266) and file nodes (270 and 272) that can correspond to local files (280 and 282) that can be versions (e.g., local cached versions) of the files (250 and 252) on the server machine (205). The container document (264) on the client machine (210) may also include metadata for the file nodes (270 and 272), such as the types of metadata discussed above. The container documents (234 and 264) on the server machine (205) and the client machine (210) may be formatted differently from each other, or they may be formatted the same as each other.

The client machine (210) can also host file managers (284 and 286), which can manage files (280 and 282) corresponding to a file node (270). For example, those files (280 and 282) can be cached versions of corresponding files (250 and 252) on the server machine (205). File managers (284 and 286) on the client machine (210) can provide access and/or editing capabilities for the files (280 and 282). For example, the file managers (284 and 286) may be applications that manage the types of files (280 and 282) (e.g., word processing application for word processing document files, spreadsheet application for spreadsheet document files, an application for presentation slide files, an application for video files, an application for image files, an application for audio files, etc.).

The client machine can also include at least one file synchronization agent (288), which can manage the synchronization of the versions of the files (280 and 282) on the client machine (210) with the versions of the files (250 and 252) on the server machine (205). The document manager (262) can also manage synchronization of the container document (264) on the client machine (210) with the container document (234) on the server machine (205).

The client machine (210) can receive and process user input (290), such as requests to make updates to the container document (264) and/or the files (280 and 282). For example, user input may request updating of one or more of the file nodes (270 and/or 272), which may result in updating of the files (280 and/or 282). Additionally, the container document (264) and the files (280 and 282) can be synchronized with the corresponding container document (234) and files (250 and 252) on the server machine (205). Accordingly, user input (290) at the client machine (210) can result in updates to the versions of the container document (234 and 264) and/or to the versions of the files (280, 282, 250, and/or 252). As will be discussed more below, the changes to the files (280 and 282) may be made asynchronously with requests for the changes, while corresponding changes to the container document (264) (e.g., changes to the file nodes (270 and/or 272)) may be made synchronously with requests for the changes (performing the act of updating the file node before returning control in response to the user input).

Another client machine (212) may include a browser (294), but not the document manager (262) and file managers (284 and 286). The content management system (230) can still allow this client machine (212) to provide access and updating of the container document (234) and the files (250 and 252) in response to user input (296) at the client machine (212). For example, this can be done using the document browser application (232) and/or the file browser applications (252 and/or 254). For example, the document browser application (232) could allow for viewing of textual element such as notes in the container document (234), viewing of a representation of the file list (236) from which users could go to the locations of the listed file nodes (240 or 242), and viewing of other information from the container document (234). Selection of a file node (240 or 242) for opening can result in a file browser application (254 or 256) providing views of the associated file (250 or 252), which can be presented at the client machine (212) using the browser (294). Updates to the container document (234) and the files (250 and/or 252) performed in response to user input (296) at the client machine (212) can later be synchronized with the versions of the container document (264) and the files (280 and 282) on the other client machine (210).

The server machine (205) can provide various services using the content management system (230). For example, as discussed above, the server machine (205) can provide viewing and editing capabilities using the document browser application (232) and the file browser applications (254 and 256). The server machine (205) may also provide versioning services, allowing the client machines (210 and/or 212) to view version histories, and possibly also access previous versions of the container document (234) and/or the referenced files (250 and/or 252). The server machine (205) may also manage permissions and sharing within the content management system (230). For example, the content management system (230) could allow personalized permissions and sharing for each file (250 or 252), and for the container document (234). Accordingly, for example, one referenced file (250) could be shared with a different set of user objects than another referenced file (252). Also, sharing or providing permissions to a referenced file (250 or 252) could also include sharing or providing permissions to associated content such as surrounding notes about the file (250 or 252) in the container document (234). The content management system (230) could also allow additional metadata to be added for the files (250 and/or 252), such as identifications of responsible user objects for a file (250 and/or 252). The content management system (230) could also provide workflows that involve the container document (234) and/or the files (250 and/or 252), such as approval workflows for the container document (234) and/or the files (250 and/or 252).

The numbers of items discussed herein and illustrated in FIG. 2 has been limited for the sake of simplicity. However, many different configurations could be used in accordance with the tools and techniques described herein. For example, the client-server system (200) may include more or fewer client machines than the client machines (210 and 212) illustrated in FIG. 2, as well as more or fewer files than the files (250, 252, 280, and 282) illustrated in FIG. 2. Also, the content management system (230) may manage more than one container document (234).

B. File Node Management Example

In one example, the container document (234 and 264) can be a notebook that includes multiple files in a folder, which may include sub-folders. For example, the files in the folder can include one or more sections of notes, with each section being in a separate file. On the server machine (205), the files (250 and 252) referenced by the file nodes (240 and 242) can reside in one folder, such as a folder located at a root of the notebook folder. While the referenced files (250 and 252) are not embedded in the files (e.g., note files) that make up the container document (234), an embedded relationship can be imitated to provide embedded-like features from a user's perspective.

Although the files (250, 252, 280, and 282) are stored separately from the container document (234 or 264) referring to them, the client-server system (200) can imitate an embedded relationship between the files (250, 252, 280, and 282) and their parent container document (234 or 264), and can synchronize the container document (234) on the server machine (205) with the container document (264) on the client machine (210).

1. File Insertion in the Container Document

When user input (290) requests insertion of a file (280 or 282) into the container document (264) on the client machine (210), the file node (270 or 272) can be inserted in the container document (264) (e.g., into one of the notes files, resulting in an icon or other representation of the inserted file in the displayed container document (264)), and the file (280 or 282) can be inserted into a local cache. For example, the file (280 or 282) may be inserted into a local cache that is dedicated to the type of the file (280 or 282) (e.g., to word processing documents, to documents in general, etc.). Additionally, the inserted file (280 or 282) can be replicated from the local cache to the server machine (205) to form a version of the file (250 or 252) on the server machine (205). Also in response to the user input, the inserted file (280 or 282) can be added to the file list (266)

The user input (290) to insert a file could take any of various forms, such as dragging the file onto a page surface of the displayed container document (264) (e.g., a displayed notebook page if the container document (264) is a notebook). As another example, the user input could select a menu option for attaching a file or creating a file while viewing the displayed container document (264).

The document manager (262) can update the file list (266) and insert the new file node (270 or 272) synchronously with the user input (290) requesting the insertion. The document manager (262) may allow the corresponding updates to the server machine (205) to be made asynchronously.

The document manager (262) can assure that the inserted file (280 or 282) is replicated to the server machine (205) before writing the corresponding file node (270) to the server. For example, the document manager (262) may trigger a synchronization by communicating with the file synchronization agent (288) (e.g., using an application programming interface call), and then wait for the file synchronization agent (288) to return an indication of success. When the file synchronization agent indicates that the synchronization of the new file (280 or 282) was successful, then the document manager (262) can initiate synchronization of the container document (264), including the new file node (270 or 272) and the updated file list (266).

A file node (240 or 242) may be inserted in the container document (234) on the server machine (205) before it is inserted in the container document (264) on the client machine (210). For example, this may occur if a different client machine (e.g., client machine (212)) initiates the insertion. In this situation, the document manager (262) can synchronize the container document (264) and make the updated container document (264) available before ensuring that the inserted file (280 or 282) has been retrieved from the server machine (205). Thus, the representation of the inserted file node (270 or 272) will be displayed, and user input can request that the corresponding file be opened. If this occurs before the inserted file (280 or 282) has been retrieved, then the document manager (262) can fetch the corresponding file (250 or 252) and include that file as a file (280 or 282) on the client machine (e.g., in a file cache).

2. Background Synchronization of the Container Document

The files (250, 252, 280, and 282) can be synchronized based on a background synchronization schedule of one or more of the container documents (234 and/or 264). For example, if such background synchronization is initiated according to a schedule that is maintained and used by the document manager (262) on the client machine (210), then the document manager (262) can initiate such background synchronization. When this occurs, the document manager (262) can also initiate synchronization of the files (280 and 282) corresponding to the file nodes (270 and 272) in the container document (264). The document manager (262) may first synchronize the container document (264) on the client machine (210) with the container document (234) on the server machine (205), so that the file nodes (270 and 272) are up to date.

The document manager (262) can retrieve information from the content management system (230) on the current state of the container document (234) and the files (250 and 252) on the server machine (205). The document manager (262) on the client machine (210) can compare this information to the current state of the files (280 and 282) that are cached on the client machine (210). This comparison can reveal which, if any, of the files (280 and/or 282) are out of date. For example, the comparison may reveal files (250, 252, 280, and/or 282) that have been modified either locally on the client machine (210) or on the server machine (205), such as by identifying files with different last-modified times since the last synchronization. As another example, the comparison may reveal referenced files (250 and/or 252) on the server machine (205) that are not yet cached on the client machine (210). The document manager (262) can initiate synchronization of these identified files (250, 252, 280, and/or 282). For example, the document manager (262) may make a call to the file synchronization agent (288), requesting that the file synchronization agent (288) oversee the synchronization of the identified files. As another example, the document manager (262) may oversee the synchronization itself, communicating with the content management system (230).

There may be conflicts when the files (250, 252, 280, and/or 282) are synchronized. For example, corresponding files (e.g., 250 and 280) on the sever machine (205) and the client machine (210) may have both been modified since the last synchronization. If this occurs, one of various different approaches may be taken to resolve the conflict. For example, the two changed files (250 and 280) could be merged, and the merged file could be used for the version of the file (250) on the server machine (205) and for the version of the file (280) on the client machine (210). Alternatively, the version of the file (250) on the server machine (205) could be used, or the version of the file (280) on the client machine (210) could be used. The approach may be chosen automatically by the client-server system, or the client machine may provide a prompt on the client machine (210), asking for user input (290) to choose which approach to take in resolving the conflict.

The document manager (262) can also make one or more modifications in metadata for the container document (264) as a result of the synchronization of the files (250, 252, 280, and/or 282). For example, for each file that has been synchronized, the document manager (262) may mark the file node (270 and/or 272) as referencing an unread file, and/or mark the page where the associated file node (270 and/or 272) is located for search re-indexing if the document manager (262) provides search indexing of the container document (264).

3. Opening Files Through the Container Document

When user input (290) directed at the container document (264) selects one of the file nodes (270 or 272) and requests that the associated document be opened, the document manager (262) can initiate the opening action. The document manager (262) can respond by checking whether the file (250 or 252) in the content management system (230) that is referenced by the file node (270 or 272) has been synchronized to the client machine (210). If not, then the document manager (262) can fetch the file (250 or 252), such as by making a call to the file synchronization agent (288) or making a call to the content management system (230). If the file (280 or 282) is already on the client machine (210) (or after the file (280 or 282) gets fetched in response to the request), then the document manager (262) can proceed with opening the file. For example, the document manager may make a call to a file manager (284 or 286), specifying the associated file (280 or 282) that is to be opened. Once opened, the file (280 or 282)

may be modified by the associated file manager (284 or 286). If the file manager (284 or 286) modifies a file (280 or 282), the modified file may be synchronized with the associated file (250 or 252) on the server machine (205), as discussed above.

4. Deleting File Nodes and Referenced Files

User input (290) at the client machine (210) may request deletion of a file node (270). For example, the user input (290) may request deletion of just the file node (270 or 272), deletion of a page or section that includes the file node (270 or 272), etc. When this occurs, the file node (270 or 272) may be synchronously deleted from the display for the container document. However, information for the file node (270 or 272) may be retained for some period to allow additional user input (290) to undo the deletion. For example, the file node (270 or 272) may be retained until it is selected to be discarded by a garbage collection technique. The document manager (262) can wait until this information for the file node (270 or 272) is discarded before deleting the file (280 or 282) referenced by the deleted file node (270 or 272). For example, the deleted file (280 or 282) can also be discarded as part of the garbage collection technique. Thus, if user input (290) requests undoing the deletion, then the referenced file (280 or 282) will still be available so long as the file node (270 or 272) is still available.

5. Cutting, Copying, and Pasting File Nodes and Referenced Files

User input (290) may request that a file node (270 or 272) be cut or copied, and then pasted into a new location in the container document (264). For example, the file node (270 or 272) may be pasted into a new location on a page, into a new page, into a new section, etc. When this occurs, the pasting of the file node (270 or 272) can be done synchronously with the user input (290) requesting the pasting, so that the pasted file node (270 or 272) can be displayed in the new location of the container document (264) on a display of the client machine (210). The new pasted file node (270 or 272) can also be modified to point to a new file (280 or 282). This may be done synchronously with the user input (290) requesting the pasting or asynchronously. Then, asynchronously with the user input (290) requesting the pasting (and possibly in a lazy manner some time later), the file can be copied to create a new file (280 or 282). This new file (280 or 282) and the new file node (270 or 272) can be synchronized with the server machine (205) to produce a corresponding new file node (240 or 242) in the container document (234) on the server machine (205), and a new file (250 or 252) on the server machine (205). This synchronization may also be done asynchronously with the user input (290) requesting the pasting.

III. Techniques for Imitation of File Embedding in a Document

Several techniques for imitation of file embedding in a document will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques may be performed at least in part by hardware logic.

Figure 3:
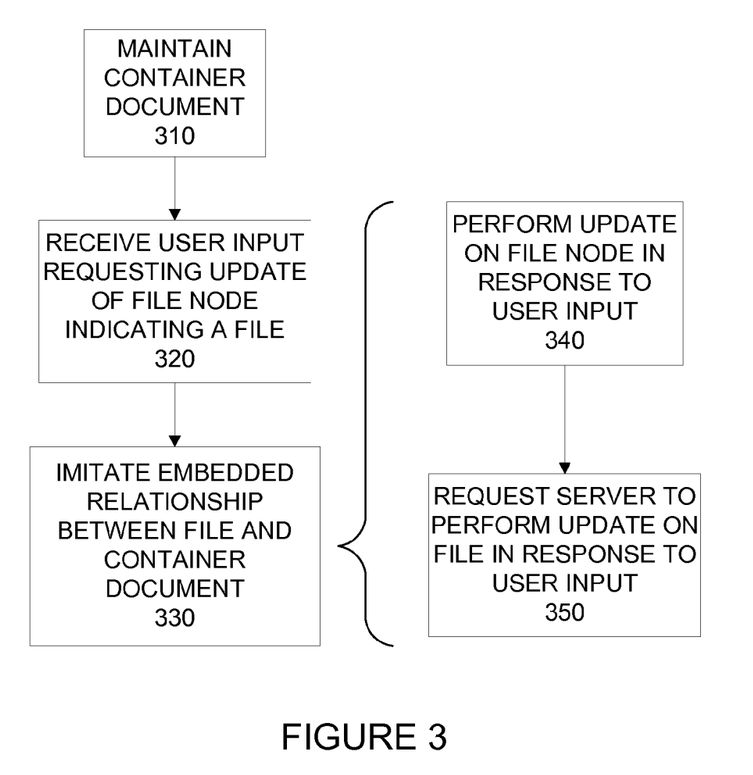
FIG. 3 is a flowchart of a technique for imitation of file embedding in a document.

Referring to FIG. 3, a technique for imitation of file embedding in a document will be described. The technique can include a client document manager maintaining (310) a container document. The container document can include a file node indicating a file and pointing to a location for the file that is separate from the container document on a remote server. User input can be received (320). The user input can request an update to be performed on the file node. Also, the user input can be directed at the container document. The technique can also include imitating (330) an embedded relationship between the file and the container document. The imitation (330) can include the client document manager performing (340) the update on the file node. The imitation (330) can also include requesting (350) that the server perform an update on the file that reflects the update performed on the file node. Performing (340) and requesting (350) can both be done in response to the user input requesting the update to be performed on the file node.

Performing (340) the update on the file node may be performed synchronously with the user input requesting the update (performing the act of updating the file node before returning control in response to the user input). Also, requesting that the server perform the update on the file can be performed in a lazy manner asynchronously with the user input requesting the update (i.e., returning control in response to the user input without waiting for the act of requesting the update to be performed).

The update on the file node can include deleting the file node, and the update on the file can include deleting the file. The file node can be an existing file node, and the file can be an existing file. The update on the file node may include copying and pasting the existing file node to create a new file node in the container document in addition to the existing file node. In this situation, the update on the file can include copying and pasting the existing file to create a new file. The new file node can indicate the new file and can point to a location for the new file on the remote server. The location for the new file can be separate from the container document and from the existing file.

The client document manager can receive a request to associate the file with the container document. In response to this request, the file node can be placed in the container document. Also in response to this request, the remote server can be requested to store the file separately from the container document, and the remote server can be requested to associate the file with the file node in the container document.

A copy of the file can be maintained in a cache on a client computer system that hosts the client document manager. This copy can be kept in sync with the copy of the file on the server, as discussed above. The remote server may also be requested to save a copy of the container document. The update on the file node can include synchronizing the container document with the copy of the container document on the remote server, and the update on the file can include synchronizing a copy of the file (e.g., a copy of the file in a client cache) with the file on the remote server.

The container document may include one or more textual items adjacent to the file node, with the one or more textual items referring to the file. For example, the container document may be a digital notebook, and the textual items may be notes adjacent to the file node and referring to the file.

Figure 4:
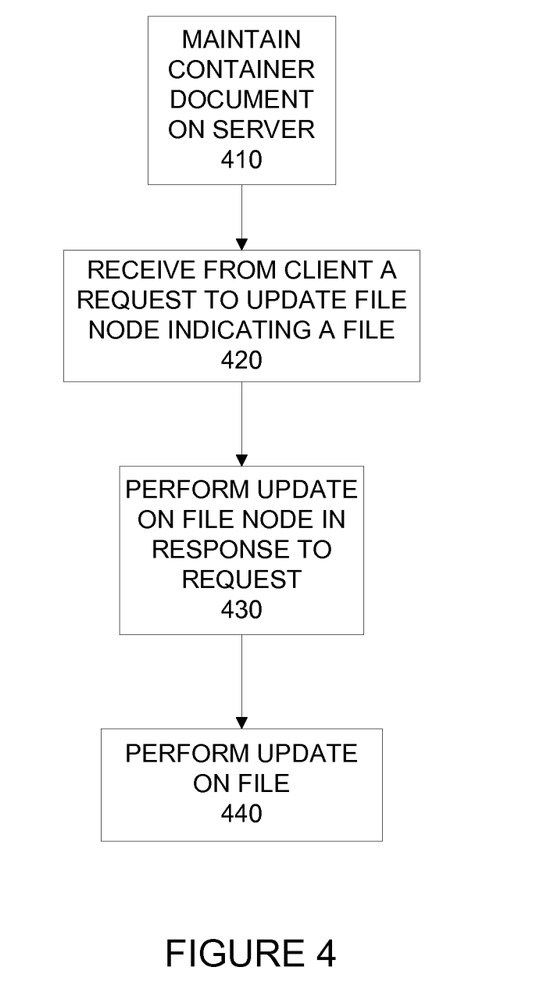
FIG. 4 is a flowchart of another technique for imitation of file embedding in a document.

Referring now to FIG. 4, another technique for imitation of file embedding in a document will be described. The technique can include a content management system maintaining (410) a container document on a server. The container document can include a file node indicating a file and pointing to a location for the file that is separate from the container document on the server. A request for an update to be performed on the file node can be received (420). The request can be directed at the container document (e.g., a user input request directed at all or a portion of the container document). The technique can also include performing (430) the update on the file node and performing (440) a corresponding update on the file that reflects the update performed on the file node, both in response to the request.

The content management system can provide a computer network browser-based application that provides views of the file and that provides editing of the file in response to user input received through the browser-based application. The content management system can maintain metadata corresponding to the file node, and may provide a view of metadata for the file node. The metadata may include metadata regarding a location of the file node in the container document, metadata regarding one or more textual items in the container document that are associated with the file, versioning information for the file, and/or other metadata. The content management system may also maintain other information, such as permissions for the file. Also, the content management system may provide permission-based sharing of the file (wherein the file can be shared, but the sharing can be limited according to permissions for the file).

Figure 5:
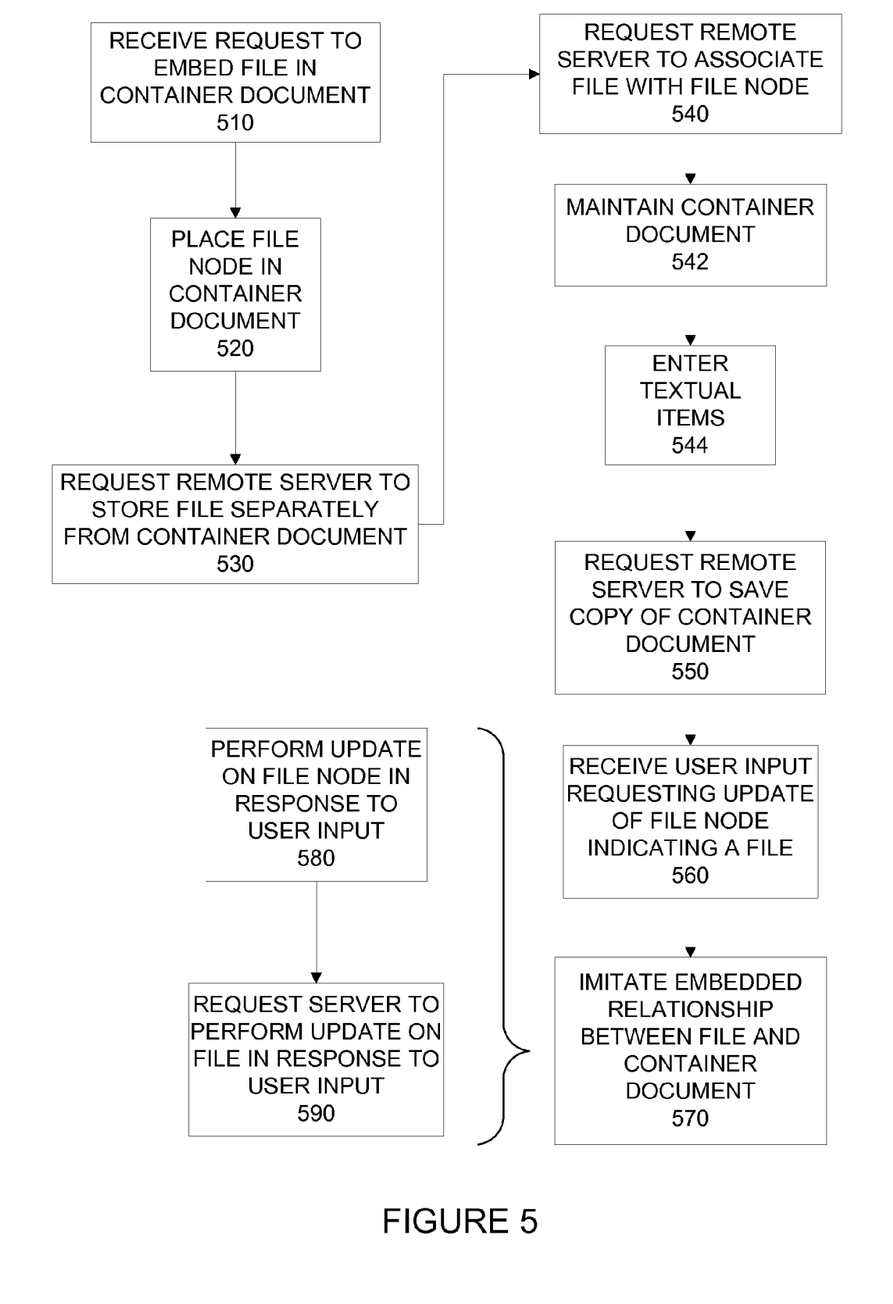
FIG. 5 is a flowchart of yet another technique for imitation of file embedding in a document.

Referring now to FIG. 5, yet another technique for imitation of file embedding in a document will be described. The technique can include a client document manager receiving (510) a request to associate a file with a container document. In response to the request, a file node can be placed (520) in the container document. The file node can indicate the file and can point to a location for the file that is separate from the container document. In response to the request to associate the file, the remote server can be requested (530) to store the file separately from the container document (e.g., as a separate file in the same folder as one or more files for the container document, etc.). In response to the request to associate the file, the remote server can also be requested (540) to associate the file with the file node in the container document. The client document manager can maintain (542) the container document. The client document manager may also enter (544) one or more textual items that refer to the file. The one or more textual items can be entered adjacent to the file node in the container document. For example, the textual item(s) can be notes referring to the file.

The document manager can request (550) that the remote server save a copy of the container document. User input can be received (560), where the user input requests an update to be performed on the file node. The user input can be directed at the container document. The technique can further include imitating (570) an embedded relationship between the file and the container document. The imitation can include the client document manager performing (580) the update on the file node in response to user input requesting the update to be performed on the file node. The update on the file node may be performed (580) synchronously with the user input requesting the update. The imitation can also include requesting (590) that the server perform a corresponding update on the file in response to the user input requesting the update to be performed on the file node, and updating a local cached copy of the file on a client computer system that hosts the client document manager. The update on the file can reflect the update performed on the file node. Requesting (590) that the server perform the corresponding update on the file can be performed asynchronously with the user input requesting the update.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
  maintaining, via a client document manager, a container document, the container document comprising an existing file node indicating an existing file and pointing to a location for the existing file that is separate from the container document on at least one remote server, with the existing file node being different from the existing file, and the container document being different from the existing file;
  receiving user input requesting an update to be performed on the existing file node, the user input being directed at the container document; and
  imitating an embedded relationship between the existing file and the container document, the imitation comprising:
    in response to the user input requesting the update to be performed on the existing file node, performing the update on the existing file node via the client document manager, the update on the existing file node comprising copying and pasting the existing file node to create a new file node in the container document in addition to the existing file node; and
    in response to the user input requesting the update to be performed on the existing file node, requesting that the at least one server perform an update on the existing file that reflects the update performed on the existing file node, the update that is requested to be performed on the existing file being different from the update performed on the existing file node, the update on the existing file comprising copying and pasting the existing file to create a new file, and the new file node indicating the new file and pointing to a location for the new file that is separate from the container document and from the existing file on the at least one remote server.

2. The method of claim 1, wherein the update on the existing file node is performed synchronously with the user input requesting the update, and wherein requesting that the at least one server perform the update on the existing file is performed as part of invoking the at least one server to perform the update on the existing file asynchronously with the user input requesting the update.

3. The method of claim 1, further comprising:
  the client document manager receiving a request to associate the existing file with the container document;
  in response to the request to associate the existing file, placing the existing file node in the container document;
  in response to the request to associate the existing file, requesting that the remote server store the existing file separately from the container document; and
  in response to the request to associate the existing file, requesting that the remote server associate the existing file with the existing file node in the container document.

4. The method of claim 1, wherein a copy of the existing file is maintained in a cache on a client computer system that hosts the client document manager.

5. The method of claim 1, further comprising requesting that the at least one remote server save a copy of the container document.

6. The method of claim 5, wherein the update on the existing file node comprises synchronizing the container document with the copy of the container document on the at least one remote server, and wherein the update on the existing file comprises synchronizing a copy of the existing file with the existing file on the at least one remote server.

7. The method of claim 1, wherein the method is performed at least in part by hardware logic.

8. The method of claim 1, wherein the container document comprises one or more textual items stored in the container document adjacent to the existing file node, the one or more textual items referring to the existing file.

9. A computer system comprising:
at least one processor; and
memory comprising instructions stored thereon that when executed by at least one processor cause at least one processor to perform acts comprising:
  maintaining, via a content management system, a container document on at least one server, the container document comprising an existing file node indicating an existing file and pointing to a location for the existing file that is separate from the container document on the at least one server, with the existing file node being different from the existing file, and the container document being different from the existing file;
  maintaining, via the content management system, the existing file on the at least one server separately from the container document;
  receiving from a remote client a request for an update to be performed on the existing file node, the request being directed at the container document;
  in response to the request, performing the update on the existing file node, the update on the existing file node comprising copying and pasting the existing file node to create a new file node in the container document in addition to the existing file node; and
  performing a corresponding update on the existing file that reflects the update performed on the existing file node, the update performed on the existing file being different from the update performed on the existing file node, the update on the existing file comprising copying and pasting the existing file to create a new file, and the new file node indicating the new file and pointing to a location for the new file that is separate from the container document and from the existing file on the at least one remote server.

10. The computer system of claim 9, wherein the content management system is configured to provide a computer network browser-based application that provides views of the existing file and to perform editing of the existing file in response to user input received through the browser-based application.

11. The computer system of claim 9, wherein the content management system is configured to maintain metadata corresponding to the existing file node.

12. The computer system of claim 9, wherein the content management system is configured to provide a view of metadata for the existing file node.

13. The computer system of claim 12, wherein the metadata in the view comprises metadata regarding a location of the existing file node in the container document.

14. The computer system of claim 12, wherein the metadata in the view comprises metadata regarding one or more textual items in the container document that are associated with the existing file.

15. The computer system of claim 12, wherein the metadata in the view comprises versioning information for the existing file.

16. The computer system of claim 9, wherein the content management system maintains permissions for the existing file.

17. The computer system of claim 9, wherein the content management system provides permission-based sharing of the existing file.

18. The computer system of claim 9, wherein the acts further comprise providing, via the content management system, one or more features that are configured to directly access the existing file.

19. Computer-readable memory having computer-executable instructions embodied thereon that, when executed by at least one processor, cause at least one processor to perform acts comprising:
  maintaining, via a client document manager, a container document, the container document comprising an existing file node indicating an existing file and pointing to a location for the existing file that is separate from the container document on at least one remote server, with the existing file node being different from the existing file, and the container document being different from the existing file;
  receiving user input requesting an update to be performed on the existing file node, the user input being directed at the container document; and
  imitating an embedded relationship between the existing file and the container document, the imitation comprising:
    in response to the user input requesting the update to be performed on the existing file node, performing the update on the existing file node via the client document manager, the update on the existing file node comprising copying and pasting the existing file node to create a new file node in the container document in addition to the existing file node; and
  in response to the user input requesting the update to be performed on the existing file node, requesting that the at least one server perform an update on the existing file that reflects the update performed on the existing file node, the update that is requested to be performed on the existing file being different from the update performed on the existing file node, the update on the existing file comprising copying and pasting the existing file to create a new file, and the new file node indicating the new file and pointing to a location for the new file that is separate from the container document and from the existing file on the at least one remote server.

* * * * *